(12) United States Patent
Awan

(10) Patent No.: US 6,438,390 B1
(45) Date of Patent: Aug. 20, 2002

(54) PLURAL STATUS INDICATION CONTROL METHOD SUITABLE FOR USE IN A COMMUNICATION DEVICE

(75) Inventor: Karamat Awan, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/305,996

(22) Filed: May 6, 1999

(51) Int. Cl.⁷ .............................. H04B 1/38; H04M 1/00
(52) U.S. Cl. ...................... 455/566; 455/575; 455/550; 340/815.45; 340/815.69
(58) Field of Search ................................ 455/566, 567, 455/575, 550; 340/815.45, 815.49, 815.65, 815.69; 345/82, 44

(56) References Cited

U.S. PATENT DOCUMENTS

| | | | |
|---|---|---|---|
| 3,987,401 A | 10/1976 | Irving | 334/36 |
| 4,544,808 A | 10/1985 | Milne et al. | 179/99 |
| 4,841,280 A | 6/1989 | Hermann | 340/706 |
| 4,926,459 A | 5/1990 | Advini et al. | 379/52 |
| 4,975,694 A | 12/1990 | Mclaughlin et al. | 340/825.44 |
| 5,339,360 A | 8/1994 | Endick et al. | 379/386 |
| 5,442,806 A * | 8/1995 | Barber | 455/435 |
| 5,548,271 A | 8/1996 | Tsuchiyama et al. | 340/311.1 |
| 5,946,636 A * | 8/1999 | Uyeno | 455/566 |
| 6,094,586 A * | 7/2000 | Nishiyama | 455/566 |

OTHER PUBLICATIONS

Qualcomm QCP–800 CDMA Portable Cellular Phone User Guide, 1996, front cover, and pp. 8–10.
StarTAC Wearable Cellular Telephone User Manual, 1995, front and back covers, and pp. 34 and 35.

* cited by examiner

Primary Examiner—Vivian Chin
Assistant Examiner—James K Moore
(74) Attorney, Agent, or Firm—Mark D. Patrick; Shigeharu Furukawa

(57) ABSTRACT

A status indicator (301) in a communication device (102), such as a cellular telephone, is controlled to visually indicate a plurality of status information during a single indication period (602). During the indication period (602), the status indicator (301) is powered-on for a first predetermined time period (t1) to indicate, for example, no service, in-service or roaming status of the cellular telephone, and powered-on for a second predetermined time period (t3) to indicate, for example, message waiting status of the cellular telephone.

4 Claims, 4 Drawing Sheets

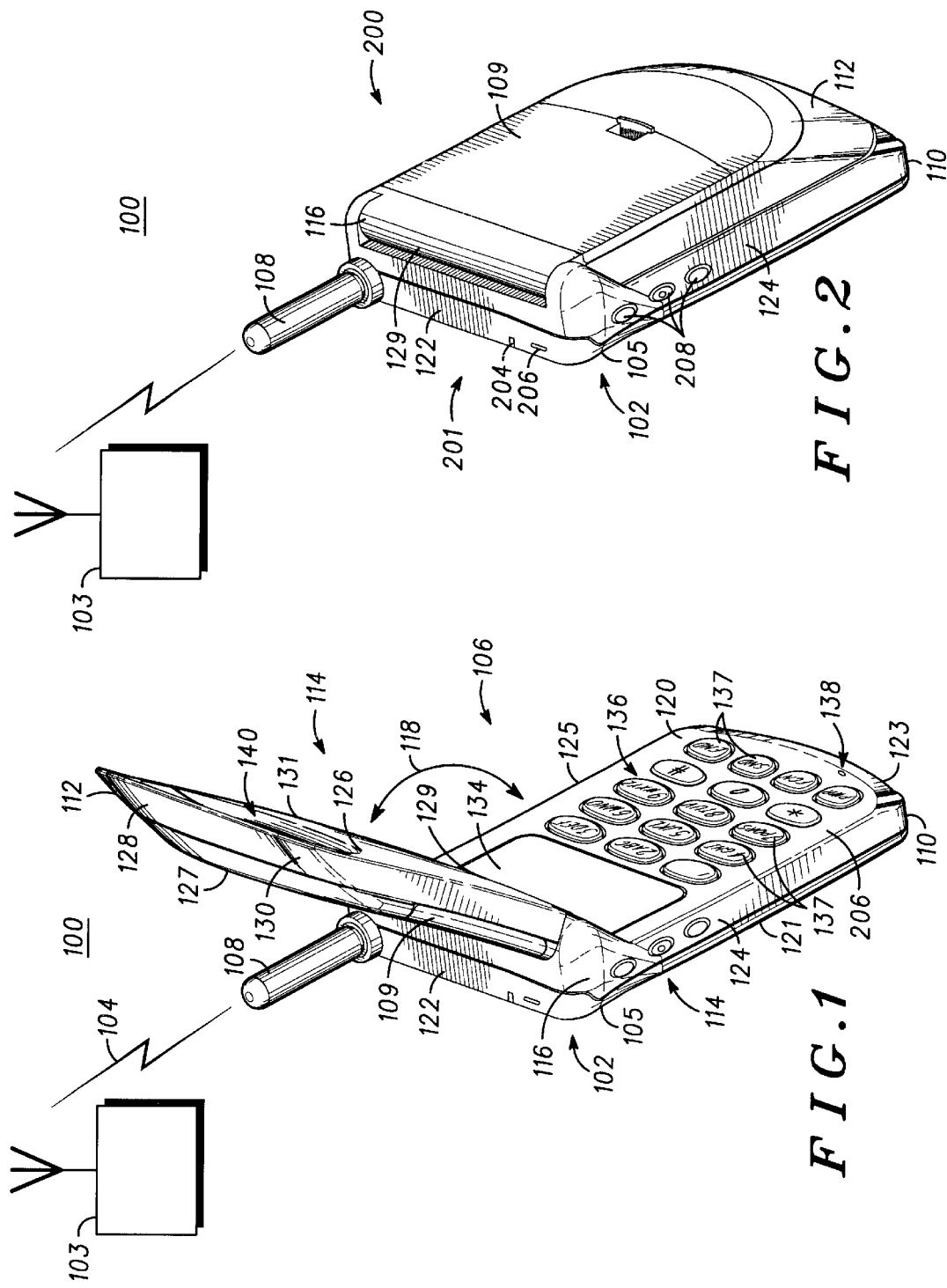

PLURAL STATUS INDICATION CONTROL METHOD SUITABLE FOR USE IN A COMMUNICATION DEVICE

FIELD OF THE INVENTION

The present invention relates to status indication in communication devices.

BACKGROUND OF THE INVENTION

Many communication devices, such as cellular telephones, employ a simple status indicator, in addition to large multi-pixel displays, to communicate information to a user of the cellular telephone. One cellular telephone employs a single light emitting diode (LED) device that flashes red when the cellular telephone receives incoming calls or incoming messages. Another cellular telephone uses a single multi-color LED device that alternates flashing red and green when the cellular telephone receives an incoming call, but does not flash when the cellular telephone receives incoming messages. When a call is not incoming, occurring or being placed, the multi-color LED device is controlled to visually indicate the operating status of the cellular telephone. The multi-color LED device flashes red when the cellular telephone has no service (i.e., the cellular telephone is beyond the range of a cellular service area and calls on the cellular telephone cannot be received or placed), flashes green when the cellular telephone is in-service (i.e., the cellular telephone is in communication with a cellular system and calls on the cellular telephone can be received or placed) and flashes yellow when the cellular telephone is roaming (i.e., the cellular telephone is accessing cellular service outside of the cellular telephone's home system).

A prior art scheme 500 for controlling a status indicator 501 to visually indicate, for example, in-service status, is shown in FIG. 5. The scheme 501 is characterized by continuous, repetitive indication periods, of which indication period 502 is exemplary. The indication period 502 has a single pulse 504, whose width corresponds to the time period that the status indicator 501 is powered-on to emit the color green corresponding to the in-service status. A user will visually perceive that the status indicator 501 flashes the color green because the pulse 504 is separated from pulse 505 of a following indication period 503 by a suitable pulse separator 506 of the indication period 502. The length of the pulse separator 506 corresponds to the time period during the indication period 502 that the status indicator 501 is powered-off. During the indication period 502, the status indicator 501 is powered-on for 500 ms and powered off for 1500 ms. As can be seen, the status indicator 501 of the prior art scheme 500 is controlled to only provide a visual indication of one type of status information (i.e., in-service status) per indication period. Also, because the cellular telephone will spend the majority of its powered-on time indicating in-service status while waiting for a call to be received or placed, the status indicator 501, as controlled according to the scheme 500, exacts a high current drain of approximately 2 mA for each indication period.

Therefore, what is needed is a method of controlling a status indicator to visually indicate a plurality of status information. The method should be conducive to minimizing current drain and optimizing usability of the status indicator.

BRIEF DESCRIPTION OF THE DRAWINGS

FIG. 1 is a perspective view illustrating a communication device operating in a communication system, the communication device is shown in an opened position and uses a multiple status indication control method;

FIG. 2 is a perspective view illustrating the device of FIG. 1 in a closed position;

DETAILED DESCRIPTION OF THE DRAWINGS

Figure 3:
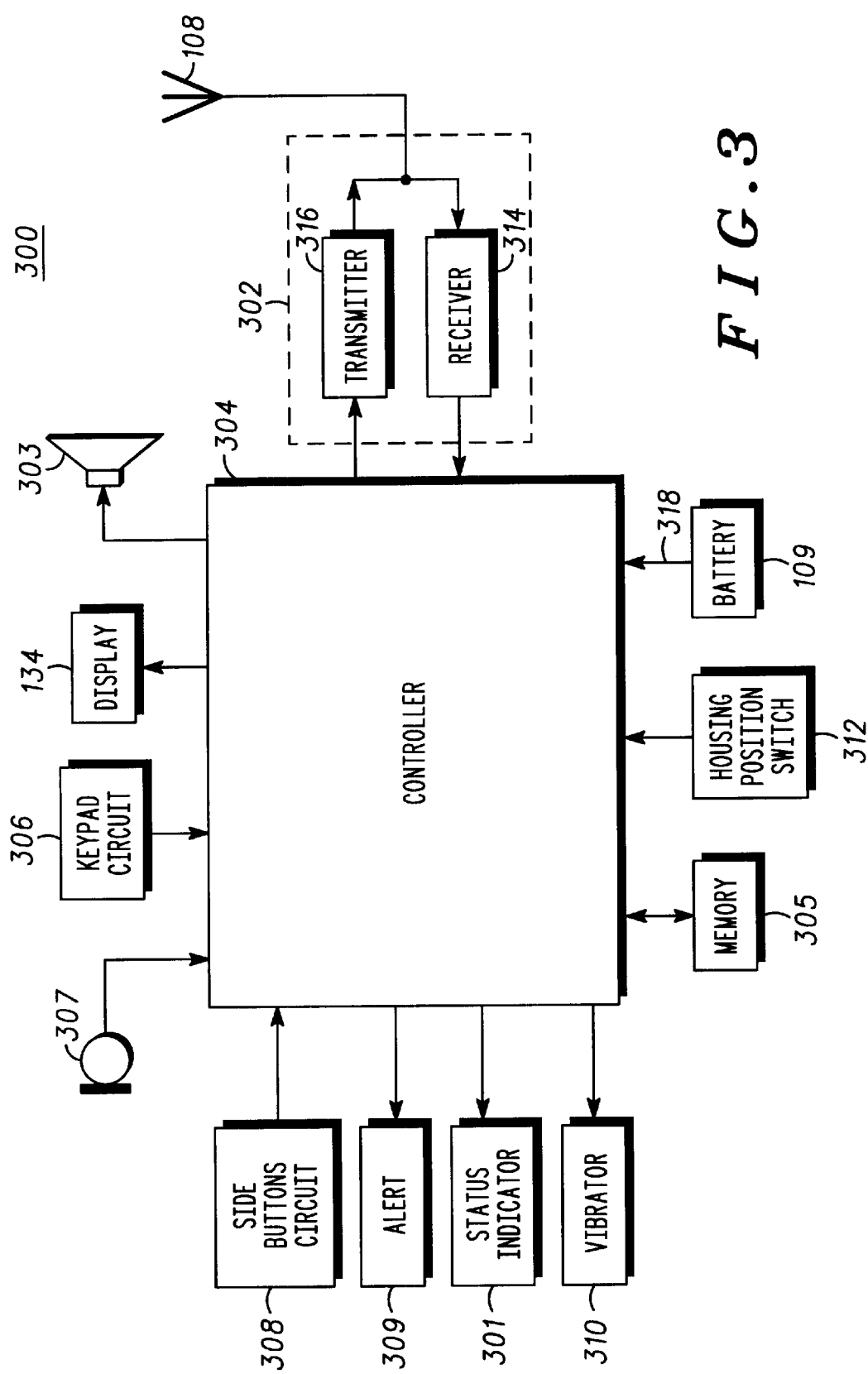
FIG. 3 is a block diagram illustrating electrical circuitry of the device of FIG. 1.

A status indicator in a communication device, such as a cellular telephone, is controlled to visually indicate a plurality of status information during a single indication period. During the single indication period, the status indicator is powered-on for a first predetermined time period to indicate, for example, no service, in-service or roaming status of the cellular telephone, and powered-on for a second predetermined time period to indicate, for example, message waiting status of the cellular telephone. By setting the duration of the first and second predetermined time periods according to a user's viewing tendencies, current drain can be minimized and usability of the status indicator can be maximized.

FIG. 1 shows a communication system 100 comprising communication devices 102 and 103. The devices 102 and 103 communicate via radio frequency (RF) signals 104. Preferably, the device 102 is a cellular telephone; the device 103 is a cellular base station that provides cellular telephone communications and additional communication services, such as messaging (e.g., paging, short messaging, email and voicemail notification) and Internet access, to the device 102; and the communication system 100 is a cellular telephone system. Although illustrated in a cellular telephone, the method described hereinbelow will also find application in cordless telephones, satellite telephones, two-way radios, pagers, personal digital assistants, and the like, and "device" as used herein shall refer to each of these and their equivalents.

The device 102 has a housing 105, an antenna 108 and a battery 109. The antenna 108 is carried on the housing 105 to transmit and receive the RF signals 104 to and from the device 103, respectively. The battery 109 is detachably coupled to the housing 105 to supply power to the device 102.

The housing 105 has housing portions 110 and 112. The housing portion 112 is movable between an opened position 114, such as that shown in FIG. 1, and a closed position 200, such as that shown in FIG. 2. The housing portion 112 is generally referred to as a movable element or a flap. The housing portions 110 and 112 are joined via a hinge 116, which permits rotation of the housing portion 112 to and from the opened and closed positions 114 and 200, as depicted by arrow 118. The housing portion 110 has front and back surfaces 120 and 121, top and bottom surfaces 122 and 123, and right and left side surfaces 124 and 125. Each of the surfaces 122–125 extend between, and are generally perpendicular to, surfaces 120 and 121. Surfaces 120, 121, 124, and 125 are substantially similar in length and define the length of the device 102 in the closed position 200 of FIG. 2. The surfaces 122–125 of FIG. 1 are generally much smaller in width than a width of surfaces 120 and 121. In the illustrated embodiment, the length of surfaces 120, 121, 124, and 125 is about 85 mm, the width of surfaces 120 and 121 is about 50 mm, and the width of surfaces 122–125 is about 10 mm. The housing portion 112 is sized and shaped similarly to that of housing portion 110 and includes similarly defined surfaces 126–131. Sized and constructed as described above, the device 102 is sufficiently dimensionally constrained in the closed position 200 of FIG. 2 to be transported in a clothing pocket or in a belt holster.

A user interface 106, shown in FIGS. 1–3, is carried on the housing 105. The user interface 106 includes output devices, which include a display 134, a speaker 303 positioned behind a speaker bezel 140, an alert 309 positioned beneath an alert aperture 206 and a status indicator 301 positioned beneath a indicator light guide 204. The user interface 106 includes input devices, which include a keypad 136, side buttons 208 and a microphone 307 positioned behind a microphone aperture 138.

The speaker 303, the display 134, the keypad 136 and the microphone 307 are positioned to be usable only when the housing 105 is in the opened position 114. The microphone aperture 138 is formed in surface 120 of housing portion 110 distal to the hinge 116 for alignment with a mouth of a user. The speaker bezel 140 is carried on surface 126 of housing portion 112 distal to the hinge 116 to align with an ear of a user. The keypad 136 has a plurality of keys 137 sized to be actuatable by a finger of a user. The plurality of keys 137 include alphanumeric keys (0, 1, 2 ABC, 3 DEF, 4 GHI, 5 JKL, 6 MNO, 7 PQRS, 8 TUV, 9 WXYZ, *, and #), a powered-on/off key (PWR), a function key (FCN), a send key (SND) and an end key (END) to facilitate telephone number and message entry.

The alert 309, the status indicator 301 and the side buttons 208 are primarily for use when the housing 105 is in the closed position 200. The indicator light guide 204, which is formed of a translucent material to permit passage of light, is fitted to an opening in the surface 122 of the housing portion 110. The alert aperture 206, which permits passage of sound waves, is formed in the surface 122. The side buttons 208, which are carried on the surface 124 of housing portion 110, are sized to be actuatable by a finger of a user.

The device 102 has electrical circuitry 300, as shown in FIG. 3. The electrical circuitry 300 includes the antenna 108; a transceiver 302; a controller 304; a memory 305; the input and output devices of the user interface 106 including the speaker 303, the display 134, the alert 309, the status indicator 301 and the microphone 307; a vibrator 310, a keypad circuit 306, a side buttons circuit 308, a housing position switch 312 and the battery 109. Although individual interconnections are not shown, it will be recognized that the battery 109, prior to reaching a low voltage level corresponding to battery depletion, provides power to all of the other electrical circuitry 300 as is necessary for that electrical circuitry 300 to operate. The controller 304 is directly coupled to all of the other electrical circuitry 300 except the antenna 108.

The transceiver 302 couples information between the device 103 of FIG. 1 and the controller 304. The transceiver 302 is coupled to the antenna 108 and includes a receiver 314 and a transmitter 316. The receiver 314 receives the RF signals 104 of FIG. 1 through the antenna 108 and demodulates the RF signals 104. The demodulated information, which includes control information and can include message or voice information, is provided by the receiver 314 to the controller 304 as receive signals. The transmitter 316 receives transmit signals, which include control information and can include message or voice information, from the controller 304 for transmission. The transmitter modulates and amplifies the transmit signals and provides the amplified transmit signals to the antenna 108 for emission as the RF signals 104.

The controller 304 receives information from the user via the input devices of the user interface 106 of FIG. 1. The keypad circuit 306 provides signals to the controller 304 in response to actuations of the keys 137 of FIG. 1 of the keypad 136. The microphone 307 provides transduced audible speech signals to the controller 304. The side buttons circuit 308 provides signals to the controller 304 in response to actuation of any of the side buttons 208 of FIG. 2. The housing position switch 312 provides signals to the controller 304 in response to the position of the housing 105 of FIG. 1. The housing position switch 312 is a magnetic reedswitch or other suitable sensor or switch.

The output devices of the user interface 106 of FIG. 1 are controlled by the controller 304 to provide information to a user. The speaker 303 is driven by the controller 304 to output audible speech derived from the voice information in the signals provided by the receiver 314. The display 134 is driven by the controller 304 to display alphanumeric and graphical information, such as status information. The alert 309 is driven by the controller 304 to sound an audible alert to, for example, signal the user to an incoming call. The vibrator 310 is driven by the controller 304 to vibrate according to a predetermined vibration pattern and provide a tactile alert to, for example, signal the user to an incoming call. The status indicator 301 is powered-on and powered-off by the controller 304 of FIG. 3, in accordance with the method described below, to provide a visual indication of status information derived from the information provided by the receiver 314 and/or from information generated by the device 102 internally. The status indicator 301 is preferably a multi-colored light emitting diode (LED) device, but can alternatively be an array of single colored LEDs or any other arrangement of one or more suitable display elements.

The memory 305 is a storage medium that is accessible by the controller 304. The memory 305 permanently stores device operating instructions. The memory 305 temporarily stores information received from the receiver 314, information generated by the controller 304 and received messages. The memory 305 is preferably a combination of random-access memory (RAM), electrically-erasable programmable read-only memory (EEPROM), read-only memory (ROM), or other suitable memory device. Although shown separately, the memory 305 could alternatively be contained within the controller 304.

The controller 304 controls the electrical circuitry 300, as previously described, according to the device operating instructions stored in the memory 305. The controller 304 includes a microprocessor (not shown) and/or other control type devices for executing the operating instructions, processing the aforementioned received signals, driving the electrical circuitry 300 in the aforementioned manner and monitoring the voltage level of the battery 109 via connection 318. The microprocessor is an 68HC12 microprocessor manufactured and sold by Motorola, Inc., or other suitable processing device.

Figure 4:
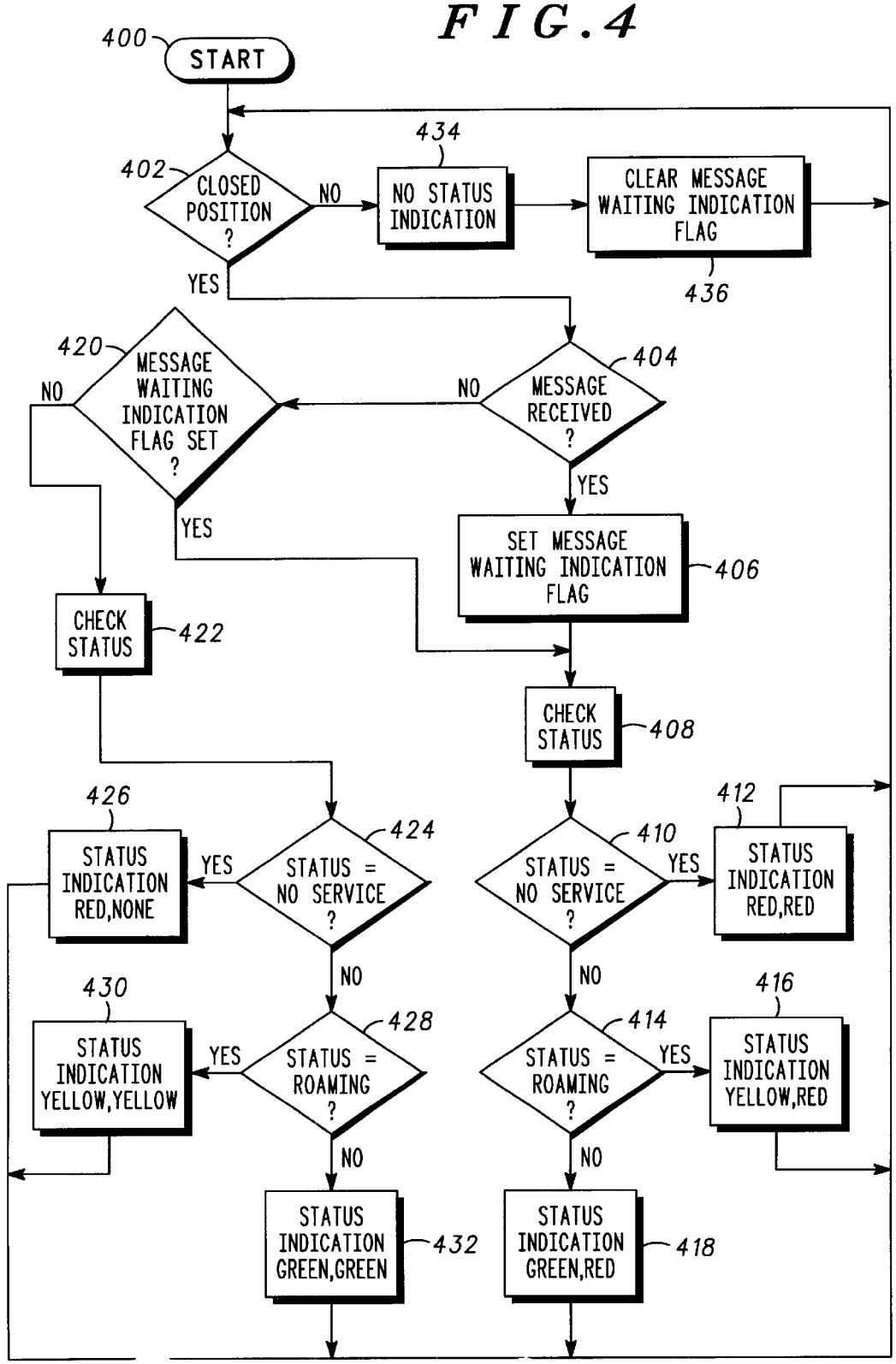
FIG. 4 is a flow chart illustrating the multiple status indication control method used in the device of FIG. 1.
Figure 6:
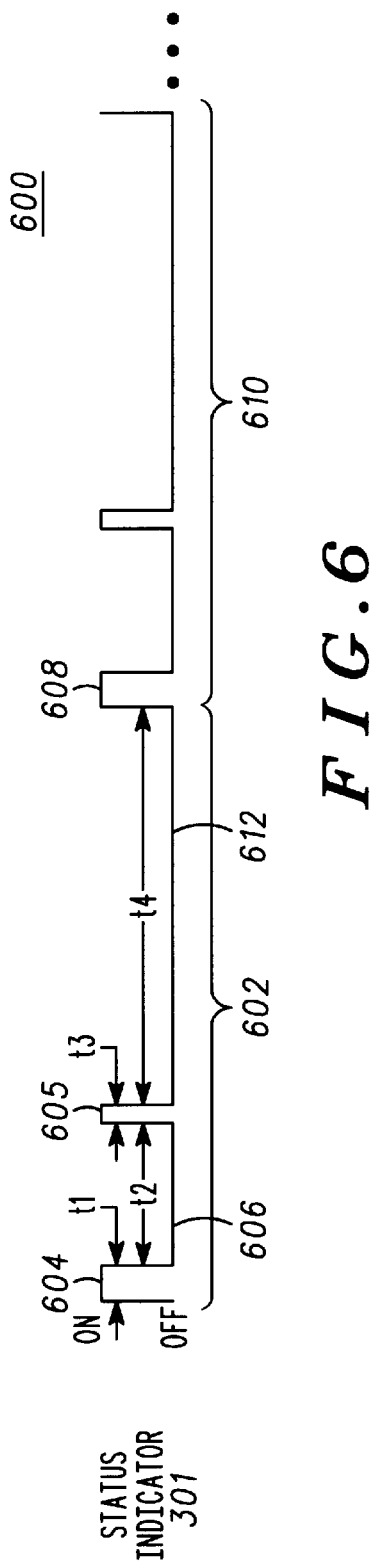
FIG. 6 is a timing diagram showing a scheme for controlling a status indicator according to the multiple status indication control method of FIG. 4.

Instructions executed by the controller 304 to control the status indicator 301 are embodied in a plurality of method steps illustrated in FIG. 4 and a timing diagram illustrated in FIG. 6. The method steps and timing diagram will be described in conjunction with FIGS. 1–4 and 6. The method of FIG. 4 is initiated when the device 102 is powered-on but not in, or receiving, a call (at step 400). The controller 304 processes the signals from the housing position switch 312 to determine if the housing 105 is in the opened position 114 or the closed position 200 (at step 402).

If the housing 105 is in the closed position 200, the controller 304 checks to see if a new message is received by the device 102 (at step 404). A new message can include a page, a short message, an email, a voicemail notification or an unanswered call indication.

If a new message is received, the controller 304 sets a message waiting indication flag stored in the memory 305 (at step 406). The controller 304 performs a status check (at step 408) to determine a plurality of status information associated with the device 102. The status information includes information describing the operating state of the device 102, such as no service status, in-service status or roaming status. The status information includes information describing the messaging state of the device 102. For example, the status information includes a message waiting status defined by whether or not the message waiting indication flag is set. If the status information indicates a no service status (at step 410), the controller 304 controls the status indicator 301 to make a status indication by emitting two red flashes (at step 412). If the status information indicates a roaming status (at step 414), the controller 304 controls the status indicator 301 to make a status indication by emitting a yellow flash followed by a red flash (at step 416). If the status information indicates an in-service status, the controller 304 controls the status indicator 301 to make a status indication by emitting a green flash followed by a red flash (at step 418). Following the status indication, the controller 304 returns to step 402.

If a new message is not received at step 404, the controller 304 checks to see if the message waiting indication flag is set (at step 420). If the message waiting indication flag is set, the controller 304 proceeds to step 408. If the message waiting indication flag is not set, the controller 304 performs a status check (at step 422), which is similar to the status check performed at step 408, to determine a plurality of status information associated with the device 102. If the status information indicates a no service status (at step 424), the controller 304 controls the status indicator 301 to make a status indication by emitting one red flash (at step 426). If the status information indicates a roaming status (at step 428), the controller 304 controls the status indicator 301 to make a status indication by emitting two yellow flashes (at step 430). If the status information indicates an in-service status, the controller 304 controls the status indicator 301 to make a status indication by emitting two green flashes (at step 432). Following the status indication, the controller 304 returns to step 402.

If the housing 105 is in the opened position 114, the user is assumed to obtain all status information, including operating and messaging states of the device 102, from the display 134. The controller 304 disables the status indicator 301 from making a status indication (at step 434) and clears the message waiting indication flag (at step 436) before returning to step 402. The message waiting indication flag is cleared upon any transition between the closed position 200 and the opened position 114.

The controller 304 controls the status indicator 301 to make the status indications of steps 412, 416, 418, 426, 430 and 432 according to a control scheme 600 shown in FIG. 6. The scheme 600 is characterized by continuous, repetitive indication periods of which indication period 602 is exemplary. During each indication period, the controller 304 traverses steps 402–432 of FIG. 4. The indication period 602 is characterized by multiple pulses, which in the illustrated embodiment are two pulses 604 and 605. The widths of the pulses 604 and 605 define time periods t1 and t3, respectively, during which the status indicator 301 is powered-on to emit the desired color. A user will visually perceive that the status indicator 301 emits two flashes when making the status indication of steps 412, 416, 418, 430 and 432 because the pulse 604 is separated from the pulse 605 by a pulse separator 606 of the indication period 602 and the pulse 605 is separated from a pulse 608 of a following indication period 610 by a pulse separator 612 of the indication period 602. The lengths of the pulse separators 606 and 612 define time periods t2 and t4, respectively, during which the status indicator 301 is powered-off. As will be discussed further below, preferred times for t1, t2, t3, t4 and the indication period 602 are 125 ms, 500 ms, 75 ms, 1500 ms and 2200 ms. When executing the step 426 of FIG. 4, the controller 304 controls the status indicator 301 to be powered-on only during the time period of the pulse 604 and remain powered-off during the time periods of the pulse separator 606, the pulse 605 and the pulse separator 612.

The preferred times for time periods t1, t2, t3, t4 and the indication period 602 of the scheme 600 of FIG. 6 were chosen to minimize current drain and optimize usability of the status indicator 301. The duration of the indication period 602 is preferably set to 2200 ms because experimentation indicated that indication periods with short durations resulted in quick flashing that is disruptive to the user and onlookers. The status indicator 301 was selected to be powered-on for only 200 ms of the indication period 602. This corresponds to a duty ratio of 9.1%, where duty ratio is (t1+t3)/(t1+t2+t3+t4)* 100%. The time period t4 of the pulse separator 612 is preferably set to 1500 ms because experimentation indicated that a user expects the status indicator 301 to visually indicate the status at least once during any 1500 ms time period. As the time period t4 exceeds 1500 ms, the user may become uncomfortable as he or she may have to look too long, or look multiple times, for the status indication. Experimentation indicated that a user typically looks for a status indication with a quick glance having a 0.5 sec. duration. The probability that a user will see the status information with the quick glance is determined by the following formula:

$$\text{Quick Check Probability} = \frac{\sum_{1}^{N}(P_N + G)}{\text{Period}} \times 100\%$$

where

N=Number of Pulses, $P_N$=Nth Pulse Duration,

G=Average Quick Glance Time=0.5 sec. and

Period=Duration of the Indication Period.

[The Quick Check Probability formula assumes that the duration of each of the separator pulses 606 and 612 are greater than or equal to G.]

Figure 5:
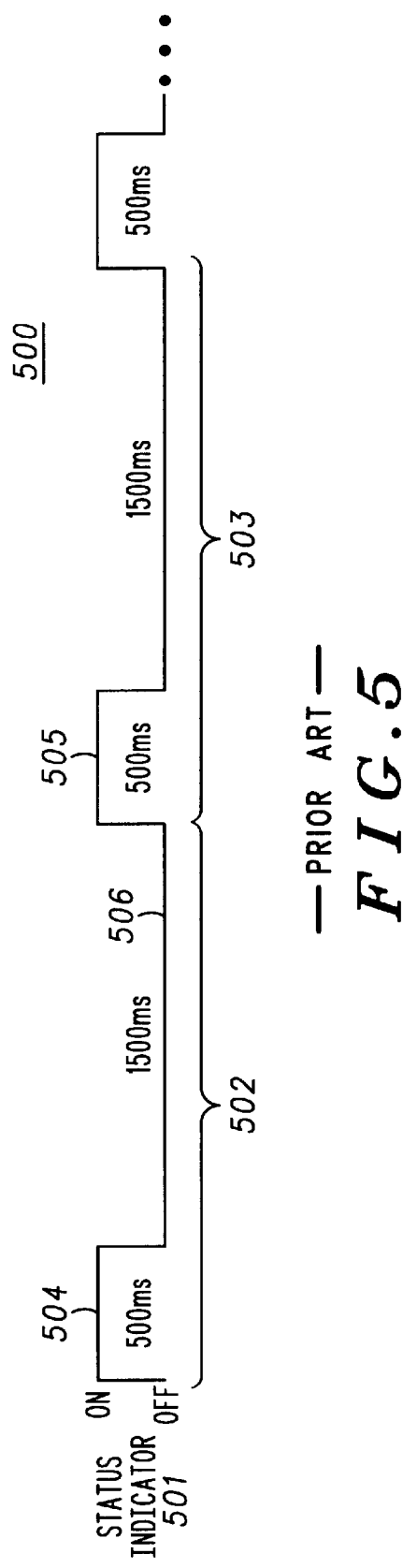
FIG. 5 is a timing diagram showing a prior art scheme for controlling a LED to visually indicate operating status of a cellular telephone.

Table 1 presents a comparison among the single pulse prior art scheme 500 of FIG. 5 and the multiple pulse scheme 600 of FIG. 6.

TABLE 1

|  | Scheme 500 | Scheme 600 |
| --- | --- | --- |
| Duty Ratio | 25% | 9% |
| Off Time Check | 1500 ms | 2000 ms |
| Quick Check Probability | 50% | 55% |
| Indication Period | 2000 ms | 2200 ms |
| Current Drain* | 2.0 mA | .72 mA |

*using LED 8 mA current

Although preferred times were shown and described, it will be recognized that other timing may be beneficially employed to realize the advantages of multiple status indication.

In addition to the above, the status indicator 301 can be controlled by the controller 304 to visually indicate battery status information. The battery status information is determined when the controller 304 performs the status check at steps 408 and 422 of FIG. 4. The controller 304 checks if there is a low battery state by comparing the voltage level of the battery 109 to a low battery threshold stored in the memory 305. If the voltage level of the battery 109 is at or below the low battery threshold (e.g., 20% capacity), the controller 304 controls the status indicator 301 to emit slow flashes at steps 412, 416, 418, 430 and 432 (or a slow flash at step 426). Slow flashing is intended to give a user the visual perception that operation of the device 102 is slowing down because the battery 109 is approaching depletion. Slow flashing is preferably accomplished by extending the time period t4 of the pulse separator 612 by the total duration of the indication period 602. In accordance with the times specified above, doubling extends the duration of the pulse separator 612 to 3700 ms and the duration of the indication period 602 to 4400 ms. Experimentation has shown that use of slow flashing as described, reduces the effective average current drain attributable to the status indicator 301 by approximately 10% and, thus, slows depletion of the battery 109.

The embodiments previously described above in association with FIGS. 4 and 6 are summarized in Table 2. In particular, column 1 of Table 2 lists the status information corresponding to the operating, messaging and/or low battery state of the device 102; columns 2 and 3 list the color of the flashes that result from the indication of status information corresponding to the operating and messaging states; and column 4 lists the duration of the indication period that result from indication of the status information corresponding to the low battery state.

TABLE 2

| Status Information | First Flash Color | Second Flash Color | Indication Period Duration (ms) |
| --- | --- | --- | --- |
| No Service | Red | None | 2200 |
| No Service, Message Waiting | Red | Red | 2200 |
| No Service, Low Battery | Red | None | 4400 |
| No Service, Message Waiting, Low Battery | Red | Red | 4400 |
| In-Service | Green | Green | 2200 |
| In-Service, Message Waiting | Green | Red | 2200 |
| In-Service, Low Battery | Green | Green | 4400 |
| In-Service, Message Waiting, Low Battery | Green | Red | 4400 |
| Roaming | Yellow | Yellow | 2200 |
| Roaming, Message Waiting | Yellow | Red | 2200 |
| Roaming, Low Battery | Yellow | Yellow | 4400 |
| Roaming, Message Waiting, Low Battery | Yellow | Red | 4400 |

Although shown and described to visually indicate the operating and messaging states using the first and second flashes, respectively, it will be recognized that the first flash could be used to visually indicate the messaging state and the second flash could be used to visually indicate the operating state.

The aforementioned colors were selected for association with the first and second flashes in order to provide additional advantages. Use of the red flash, instead of a green or yellow flash, to indicate the message waiting status further minimizes current drain. In particular, while indication of the message waiting status is occurring, the instantaneous current drain of the status indicator 301 is reduced by 25%. Driving a red or multi-colored LED to emit the color red consumes less current than driving a green, yellow or multi-colored LED to emit the color green or yellow. Use of a single red flash to indicate no service status and double green flashes to indicate in-service status allows a red-green color blind person to determine the difference between no service and in-service.

Although shown to be used in a closeable communication device, the method of FIG. 4 is suitable for use by all communication devices regardless of housing construction, display location or the amount of status information provided by the display. To accommodate these non-closeable devices, the decision "CLOSED POSITION?" at the step 402 of the method of FIG. 4 would be changed to, for example, "KEEP STATUS INDICATOR ACTIVE?." The controller 304 would determine if a key, a button or a switch associated with temporarily deactivating the status indicator 301 was actuated. For those devices that provide status information on the display, the user may wish to keep the status indicator active when the device is positioned away from the user at a distance from which the display is not viewable but the flashes emitted by the status indicator are viewable. If the status indicator 301 is to be kept active (i.e., there is no actuation to temporarily deactivate the status indicator 301), the controller 304 proceeds to step 404. If the status indicator 301 is not to be kept active (i.e., there is an actuation to temporarily deactivate the status indicator 301), the controller 304 proceeds to step 434.

Thus it can be seen that a plurality of status information can be visually indicated during a single indication period. By controlling a status indicator to make the visual indications according to a predetermined scheme designed according to a user's viewing tendencies, current drain can be minimized and usability of the status indicator can be maximized. While particular embodiments have been shown and described, it will be recognized that modifications may be made. For example, to further minimize current drain, the status indicator 301 of FIG. 3 could visually indicate the plurality of status information only on-demand from the user such as pursuant to a user's actuation of one of the side buttons 208 of FIG. 2. Upon actuation, the controller 304 of FIG. 3 would control the status indicator 301 according to the scheme 600 to visual indicate one or more indication periods of the plurality of status information. It is therefore intended in the appended claims to cover all such changes and modifications which fall within the true spirit and scope of the invention.

What is claimed is:

1. A method of controlling a status indicator in a communication device, the method comprising the steps of:

determining a plurality of status information associated with the communication device;

powering-on, during an indication period of multiple pulses, the status indicator for a first predetermined time period characterized by a pulse width to indicate first status information of the plurality of status information;

powering-off, during the indication period for a second predetermined time period;

powering-on, during the indication period of multiple pulses, the status indicator for a third predetermined time period characterized by a pulse width to indicate second status information of the plurality of status information; and powering-off, during the indication period for a fourth predetermined time period;

wherein the step of powering-on for the first predetermined time period comprises the step of setting the first predetermined time period to 125 ms, the step of powering-off for the second predetermined time period comprises the step of setting the second predetermined time period to 500 ms, the step of powering-on for the third predetermined time period comprises the step of setting the third predetermined time period to 75 ms, and the step of powering-off for the fourth predetermined time period comprises the step of setting the fourth predetermined time period to 1500 ms.

2. A method of controlling a status indicator in a communication device, the method comprising the steps of:

determining a plurality of status information associated with the communication device;

powering-on, during an indication period of multiple pulses, the status indicator for a first predetermined time period characterized by a pulse width to indicate first status information of the plurality of status information;

powering-off, during the indication period for a second predetermined time period;

powering-on, during the indication period of multiple pulses, the status indicator for a third predetermined time period characterized by a pulse width to indicate second status information of the plurality of status information; and powering-off, during the indication period for a fourth predetermined time period;

wherein the step of powering-off for the fourth predetermined time period comprises the step of setting the fourth predetermined time period according to a low battery status of the plurality of status information.

3. A method according to claim 2 wherein the step of powering-off for the fourth predetermined time period comprises the steps of:

setting the fourth predetermined time period to a first duration when a low battery status of the plurality of status information has not been determined; and setting the fourth predetermined time period to a second duration when a low battery status of the plurality of status information has been determined, the second duration equal to a sum of the first duration and a duration of the indication period.

4. A method of controlling a status indicator in a communication device during consecutive indication periods, the method comprising the steps of:

during a first one of the consecutive indication periods, powering-on the status indicator for a first predetermined time period to indicate one of an operating state of the communication device and a messaging state of the communication device, powering off, following the first predetermined time period, the status indicator for a second predetermined time period, powering-on the status indicator for a third predetermined time period to indicate the other one of an operating state of the communication device and a messaging state of the communication device, powering off, following the third predetermined time period, the status indicator for a fourth predetermined time period; and during a second one of the consecutive indication periods, powering-on, following the fourth predetermined time period, the status indicator for a fifth predetermined time period to indicate the one of an operating state of the communication device and a messaging state of the communication device, the fifth predetermined time period equal to the first predetermined time period.

* * * * *